July 19, 1966 — I. B. CASSIDY — 3,261,503
ADJUSTABLE DIAL DISPENSER
Filed July 24, 1964
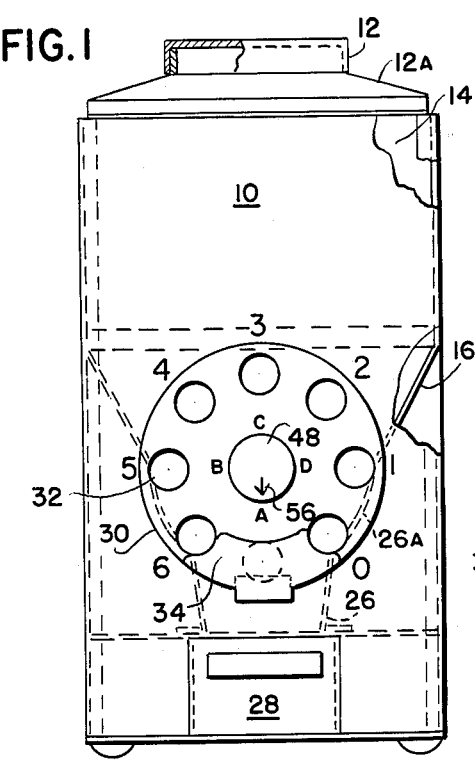
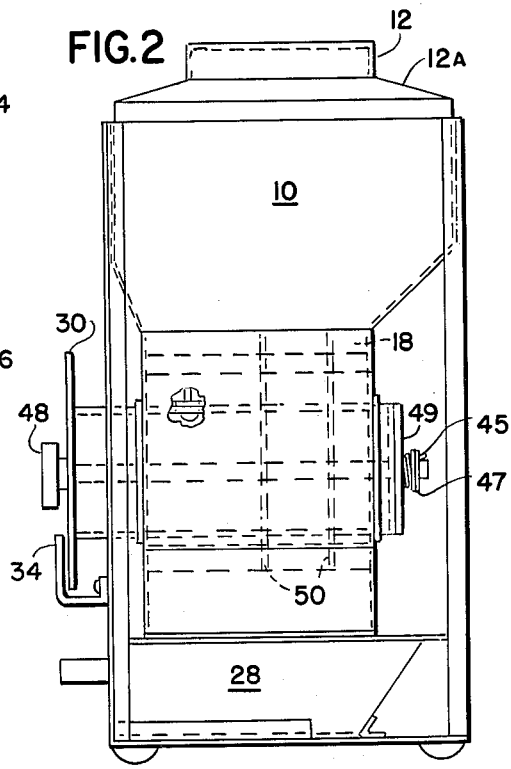
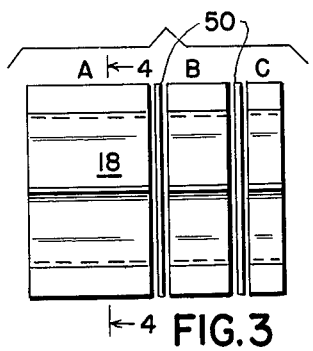
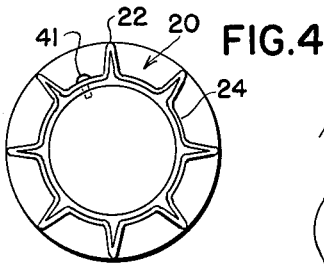
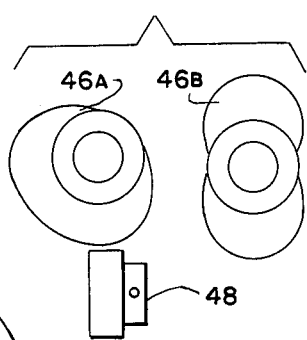
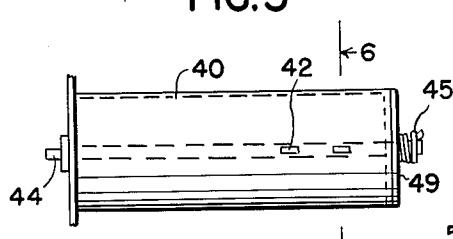
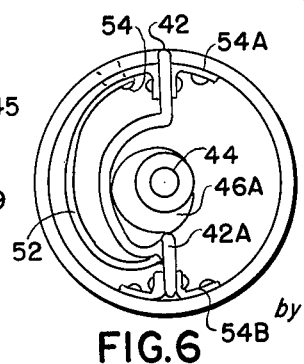
INVENTOR.
Irwin B. Cassidy
by Nathaniel Ely
ATTORNEY.

United States Patent Office 3,261,503
Patented July 19, 1966

3,261,503
ADJUSTABLE DIAL DISPENSER
Irwin B. Cassidy, 219 Linden Ave., Westfield, N.J.
Filed July 24, 1964, Ser. No. 384,944
4 Claims. (Cl. 222—42)

This invention relates to improvements in an adjustable dial dispenser more particularly for granular free flowing materials and in one embodiment, is arranged for a home use coffee dispenser.

The dispensing art is one of the most prolific for the measuring and dispensing of free flowing materials of various sizes and for various purposes. It has long been recognized that the repetitive dispensing of accurately measured amounts is a desirable objective. It has also been known to provide apparatus that will establish small incremental units less than a full unit. However, for home use, as in measuring unit amounts for one or more cups of coffee, it is essential that the dispenser have other requirements to meet commercial competition. Not only must the dispenser be able to conveniently distribute the desired quantities, or the reasonable increments thereof, but the dispenser must be adaptable for home use. It must be relatively simple and inexpensive. It must be attractive and preferably small, and for coffee, it should be sufficiently air tight to prevent loss of aroma and/or acquisition of moisture from the atmosphere.

My invention has for its principal object, a granular or particulate solids dispenser for the storage and rapid dispensing of one or more unit quantities of solids, which unit may be a basic unit, or a readily adjustable incremental unit.

A more specific object of my invention is to provide a storage and dispensing apparatus for home use for holding a quantity of a free flowing particulate solid and for discharging, as desired, one or more predetermined unit quantities into a receptacle, such discharge permitting repetitive operation depending upon the operator's selection.

Another object of my invention is to provide a granular coffee dispenser for home use, characterized in having a dial actuated dispensing mechanism for one or more units (i.e., cup quantities) for the rapid and repetitive dispensing, which dial mechanism is provided with a simplified cam mechanism for adjusting the size of each unit, as for accommodation to varying strengths desired.

Another object of the invention is to provide the dispenser chamber with a cap which acts as a funnel in emptying the coffee or other granular material from the container in which it is sold.

Further objects and advantages of my invention will appear from the following description of a preferred form of embodiment thereof when taken with the drawings attached which are further illustrative thereof and in which:

FIG. 1 is a front elevation, with parts broken away of my adjustable dial dispenser for coffee distribution in the home.

FIG. 2 is a side elevation of the apparatus shown in FIG. 1.

FIG. 3 is an elevation of the measuring drum elements.

FIG. 4 is a transverse cross section view of one of the measuring drum elements on the line 4—4 thereof.

FIG. 5 is a top plan view of the cam cylinder.

FIG. 6 is a transverse cross section on the line 6—6 of FIG. 5 showing the pin.

FIG. 7 is a composite elevation and end view of the various operating cams.

The dispenser generally indicated at 10 in FIG. 1 is normally a vertically standing device having a container for a granular or particulate material of which one embodiment is coffee, either of the ground and roasted type for further cooking (percolation) or of the instant type ready to be dissolved. While the invention is applicable to other similar materials that are repeatedly distributed or dispensed in unit quantities around the house which are measured by the cup, teaspoon, etc., the units of which are always of the same size, the particular apparatus shown and hereinafter described is adapted to the dispensing of coffee.

Within this dispenser 10, which has a closure lid 12 fitting over a transition piece 12a, is a reservoir or chamber 14 having downwardly and inwardly slanted sides 16 which serve to retain somewhat more than a standard size package of the particulate solids to be dispensed; in this case, a pound or multiple thereof of coffee. With little variation except in size, this chamber 14 could be made to hold two pounds of coffee (which is a typical size sold by the stores, or could be made to hold five pounds of material which is also a standard size pack). Normally, the small householder does not open more than two pounds of coffee at one time to avoid too rapid loss of aromatic quality and other deterioration. However, in the small restaurant, larger quantities might be standard units.

At the apex of the slanting sides 16 is a dispensing drum 18, which, as shown in FIG. 3, is a plurality of star shaped sections each having receiving pockets 20 defined by the star-like projections 22 and the hub 24, and circular end pieces which also serve as bearings to support the sections on the drum 40. Intermediate spacers 50 hereinafter described serve to separate the sections. Furthermore, as shown in FIG. 3, the dispensing drum is made in several sections of varying lengths, section "A" having a length which is greater than section "B" and section "B" greater than section "C." This dispensing drum is mounted on driving drum 40 shown in FIG. 5.

It will be understood that as the dispensing drum is rotated, one or more of the receiving pockets 20 will accept a unit volume of the particulate material from the chamber 14. The material is confined by the drum pocket 20 and circumferential portion 26A as an extension of the slanting sides 16 and as the drum 18 is rotated, the material finally discharges into the chute 26 from which it drops by gravity into the removable tray 28. As the dispensing operation is completed, the tray 28 is then discharged into the coffee pot or similar location as desired. The close fit of the various star-like projections 22 against this circumferential portion 26A also acts as a seal for the chamber 14.

Rotation of the dispensing drum is accomplished by a dial wheel 30 conveniently having apertures 32 (or alternatively knobs) of which an example is eight. By inserting a finger in an aperture, as indicated by the Nos. 1–6 printed on the front panel, up to six unit advances of the dispensing drum will result by rotating the wheel clockwise whereby from one to six unit amounts of particulate solids will be discharged into the tray 28. To assure uniformity in radial movement, a finger stop 34 is used and this is conveniently extended over the intermediate space at the bottom of the dial wheel. The first opening designated "0" is, of course, the end of the path and the opening which might be designated number 7 is covered by the stop 34. The finger stop covers one hole to provide wider opening into the chute to insure that the pockets in the drum are completely emptied. To prevent anticlockwise rotation of the dial wheel, a conventional pawl and notched mechanism is recommended.

While the foregoing construction will permit the uniform and repetitive discharge of the desired number of unit quantities of particulate solids, there are many occasions when it is desired to change the size of the unit. Coffee drinkers, especially, frequently prefer variations in strength of coffee from weak to strong portions. As hereinafter described, I have provided a simple operation to permit this change. The dispenser as shown provides for four strengths but this could be varied by using a different number of drum elements.

As heretofore mentioned, the dispensing drum 18 consisting of sections "A," "B," and "C" are mounted on the driving drum 40; conveniently, section "A" may be permanently attached to the drum 40 by a screw or pin 41. The remaining sections "B" and "C" are detachably connected to the driving drum through cam operated pins generally indicated at 42.

These driving pins 42, as shown in FIG. 6, are spring actuated by means of the spring 52 suitably anchored at 54, the free end engaging the extension 42A which acts as a follower portion on the driving pin. Suitable shoulders 54A and 54B serve as guides for the movement of the driving pins 42. With the rotation of the cam shaft 44, one or more of the cams 46A and 46B come into engagement with the driving pin follower portion 42A to retract the driving pin from engagement with the related section "B" or "C." Engagement is accomplished by pin 42 projecting into the hollow interior of star-like projection 22.

The cam shaft 44 is driven by the cam adjustment knob 48 which may have the pointer 56, which, with the designations "A," "B," "C" and "D" will represent varying strengths of coffee as determined by which combinations of dispensing drum sections are in operation. As an example of my preferred construction, the volume of each receiving pocket 20 in section "A" is set at 1.05 cubic inches; section "B" is set at 0.50 cubic inch, and that for section "C" is set at 0.25 cubic inch.

The settings of the cam shaft are thus:

| Position | Drum | Cam | Cubic Inches |
|---|---|---|---|
| A | A | 0 | 1.05 |
| B | A+C | 2 (46B) | 1.30 |
| C | A+B | 1 (46A) | 1.55 |
| D | A+B+C | 1+2 | 1.80 |

To avoid frictional drive of units "B" and "C" from one another or from unit "A," suitable spacers 50, locked against rotation, are provided.

While the assembly of the unit is not critical, I prefer to insert the dispensing sections "A," "B" and "C" through the top of the dispenser and to insert the driving drum through an opening in the front of the device and through openings in the front and rear of sides of chamber 14. This drum with its dial wheel 30 will then be retained in place by the screw 41. The cam shaft 44 may be secured to the drum 40 by being held in the dial wheel and in detachable end piece 49 by a suitable lock nut 45 and tension washer or spring 47.

The transition piece 12A not only closely fits the top of the dispenser chamber 14 and has the removable close fitting top 13 which may be circular, but it has the advantage that it is removable and when inverted, will serve as a funnel to aid in filling the container chamber 14. In such case, the cap 12 is, of course, previously removed.

It will be understood that the device may be made of typical construction materials such as aluminum, steel products or plastic. Furthermore, although my description has been largely concerned with dispensing of coffee, it can also be adapted to other flowing materials such as sugar, flour, etc., and, in such case, the unit may be a cup and the increment, a fraction thereof.

While I have shown and described a preferred form of embodiment of my invention, I am aware that modifications may be made thereto within the scope and spirit of the description herein and of the claims appended hereinafter.

I claim:
1. A metering dispenser for loose material comprising a hollow walled chamber, said chamber having an opening in the lower wall thereof, a rotatable dispensing drum located adjacent the chamber and normally closing said opening, said dispensing drum being provided with a series of peak portions between which are recesses which are capable of receiving unit amounts of loose material, means to rotate said dispensing drum to transfer a predetermined number of unit amounts of loose material through the opening and to discharge the material from the chamber, means to predetermine the number of unit amounts to be dispensed, the walls of the chamber closely fitting the peaks of the drum to prevent flow of loose materials except when said drum is turned, said dispensing drum including a plurality of sections, and means to selectively engage one or more of the sections whereby incremental units of different volumes of loose material may be discharged at the rotation of the dispensing drum.

2. A metering dispenser as claimed in claim 1 in which the dispensing drum sections are mounted on a cam cylinder, and said cam cylinder carries at least one cam and cam shaft and cam follower whereby on rotation of the cam shaft, at least one section may be rendered ineffective, or conversely, made effective.

3. A metering dispenser as claimed in claim 2 wherein the largest drum section is permanently mounted on the cam cylinder, and there are at least three drum sections having the volumetric ratio per pocket of 1.05:0.50:0.25, whereby on variation of the cam shaft combinations of 1.05, 1.30, 1.55, and 1.80 can be dispensed for each of the units dispensed by the rotation of the dial wheel.

4. A metering dispenser as claimed in claim 1 wherein the dispenser is provided with a top and a transition piece that normally seals the chamber, and said transition piece is reversible to act as a funnel for filling purposes.

References Cited by the Examiner

UNITED STATES PATENTS

| 2,025,821 | 12/1935 | Nordmarken | 222—368 |
| 2,072,938 | 3/1937 | Berg | 222—42 |
| 2,643,032 | 6/1953 | Berndt | 222—368 X |

EVON C. BLUNK, *Primary Examiner.*

CHARLES R. CARTER, LOUIS J. DEMBO, *Examiners.*